(12) United States Patent
Park et al.

(10) Patent No.: US 12,527,164 B2
(45) Date of Patent: Jan. 13, 2026

(54) TRANSPARENT DISPLAY APPARATUS (71) Applicant: LG Display Co., Ltd., Seoul (KR)

(72) Inventors: Sunyoung Park, Paju-si (KR);
Seongku Lee, Paju-si (KR); Sunghee Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 524 days.

(21) Appl. No.: 17/976,127

(22) Filed: Oct. 28, 2022

(65) Prior Publication Data

US 2023/0200143 A1    Jun. 22, 2023

(30) Foreign Application Priority Data

Dec. 21, 2021  (KR) .................. 10-2021-0184219

(51) Int. Cl.
*H10K 59/122*     (2023.01)
*H10K 50/844*     (2023.01)

(52) U.S. Cl.
CPC ......... *H10K 59/122* (2023.02); *H10K 50/844* (2023.02)

(58) Field of Classification Search
CPC .. H10K 50/844; H10K 59/122; H10K 59/124; H10K 59/8722
See application file for complete search history.

(56) References Cited

U.S. PATENT DOCUMENTS

| | | | |
|---|---|---|---|
| 2018/0190724 A1 | 7/2018 | Kang | |
| 2019/0058021 A1* | 2/2019 | Kim | H10K 59/8722 |
| 2019/0196616 A1* | 6/2019 | Mizunuma | G06F 1/1677 |
| 2019/0196619 A1 | 6/2019 | Baek | |
| 2020/0136068 A1* | 4/2020 | Lee | H10K 77/111 |
| 2020/0203653 A1 | 6/2020 | Um et al. | |
| 2020/0321292 A1* | 10/2020 | Park | H01L 23/60 |
| 2021/0151712 A1 | 5/2021 | Lee et al. | |
| 2021/0202664 A1 | 7/2021 | Kim | |
| 2021/0202907 A1 | 7/2021 | Lee et al. | |

FOREIGN PATENT DOCUMENTS

| | | |
|---|---|---|
| CN | 112820759 A | 5/2021 |
| CN | 113053961 A | 6/2021 |
| KR | 2017-0038605 A | 4/2017 |
| KR | 20180079092 A | 7/2018 |
| KR | 2019-0079742 A | 7/2019 |
| KR | 20210086290 A | 7/2021 |

OTHER PUBLICATIONS

Office Action dated Mar. 14, 2025 issued in corresponding Korean Patent Application No. 10-2021-0184219.
Office Action dated Nov. 15, 2025, issued in corresponding Chinese Patent Application No. 202211317060.7.

* cited by examiner

*Primary Examiner* — Shaun M Campbell
(74) *Attorney, Agent, or Firm* — Morgan, Lewis & Bockius LLP (57) ABSTRACT

A transparent display apparatus is provided, which has excellent encapsulation characteristics while reducing a bezel width. The transparent display apparatus includes a display area disposed on a substrate, including a pixel having a transmissive portion, and a non-display area disposed near the display area, having a GIP portion, and a moisture permeation preventing portion disposed between the GIP portion and the display area.

21 Claims, 5 Drawing Sheets

TRANSPARENT DISPLAY APPARATUS

CROSS-REFERENCE TO RELATED APPLICATIONS

This application claims the benefit of the Korean Patent Application No. 10-2021-0184219 filed on Dec. 21, 2021, which is hereby incorporated by reference as if fully set forth herein.

BACKGROUND

Technical Field

The present disclosure relates to a transparent display apparatus.

Discussion of the Related Art

With the advancement of the information age, the demand for a display device for displaying an image has increased in various forms. Therefore, various types of display devices such as a liquid crystal display (LCD) device, a plasma display panel (PDP) device, an organic light emitting display (OLED) device and a quantum dot light emitting display (QLED) device have been recently used.

Recently, studies for a transparent display apparatus in which a user may view objects or images positioned at an opposite side by transmitting the display apparatus are actively ongoing.

The transparent display apparatus includes a display area on which an image is displayed, and a non-display area that includes a bezel area, wherein the display area may include a transmissive area capable of transmitting external light, and a non-transmissive area.

A non-display area may include a circuit portion for driving an image of a display area, an inner dam surrounding the circuit portion, and an outer dam surrounding the inner dam and preventing moisture permeation to the display area. The outer dam may be provided with a wide width to enhance a moisture permeation preventing effect. This causes a problem in that a bezel width of the transparent display apparatus is increased.

SUMMARY

Accordingly, embodiments of the present disclosure are directed to a transparent display apparatus that substantially obviates one or more of the problems due to limitations and disadvantages of the related art.

An aspect of the present disclosure is to provide a transparent display apparatus that has excellent encapsulation characteristics while reducing a bezel width.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a transparent display apparatus comprises a display area disposed on a substrate, including a pixel having a transmissive portion, and a non-display area disposed near the display area, having a GIP portion, and a moisture permeation preventing portion disposed between the GIP portion and the display area.

In another aspect, a transparent display apparatus comprises a display area provided on a substrate, including a pixel having a transmissive portion, a non-display area near the display area, having a GIP portion, and a plurality of lower dams disposed between the GIP portion and the display area to surround the display area, wherein the plurality of lower dams are spaced apart from each other in the non-display area.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings.

The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

"X-axis direction", "Y-axis direction" and "Z-axis direction" should not be construed by a geometric relation only of a mutual vertical relation and may have broader directionality within the range that elements of the present disclosure may act functionally.

The term "at least one" should be understood as including any and all combinations of one or more of the associated listed items. For example, the meaning of "at least one of a first item, a second item and a third item" denotes the combination of all items proposed from two or more of the first item, the second item and the third item as well as the first item, the second item or the third item.

Features of various embodiments of the present disclosure may be partially or overall coupled to or combined with each other and may be variously inter-operated with each other and driven technically as those skilled in the art can sufficiently understand. The embodiments of the present disclosure may be carried out independently from each other or may be carried out together in co-dependent relationship.

Hereinafter, the preferred embodiments of the present disclosure will be described in detail with reference to the accompanying drawings.

Figure 1:
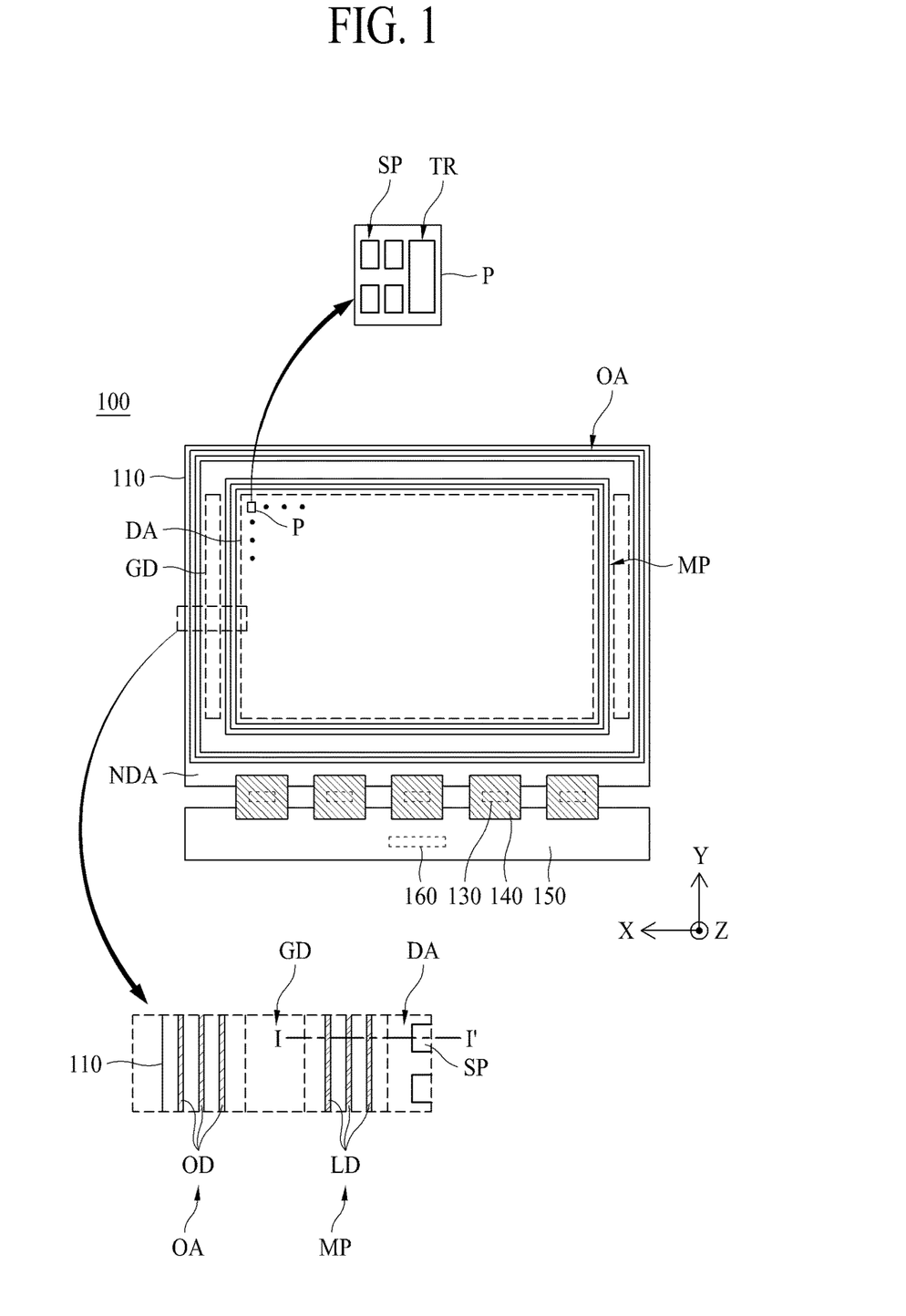
FIG. 1 is a plan view illustrating a transparent display apparatus according to one embodiment of the present disclosure.
Figure 2:
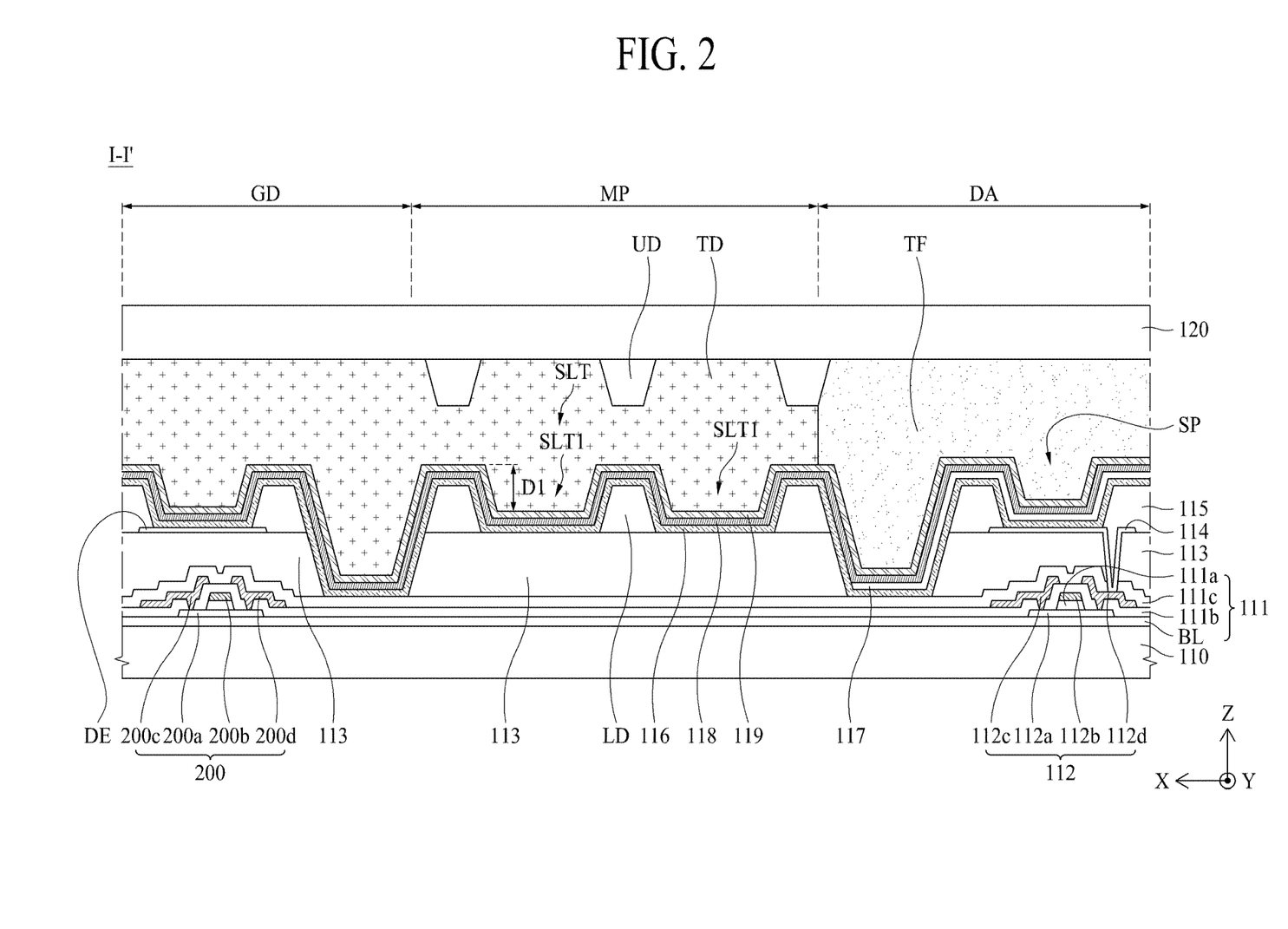
FIG. 2 is a cross-sectional view illustrating an example of line I-I' shown in FIG. 1.
Figure 3:
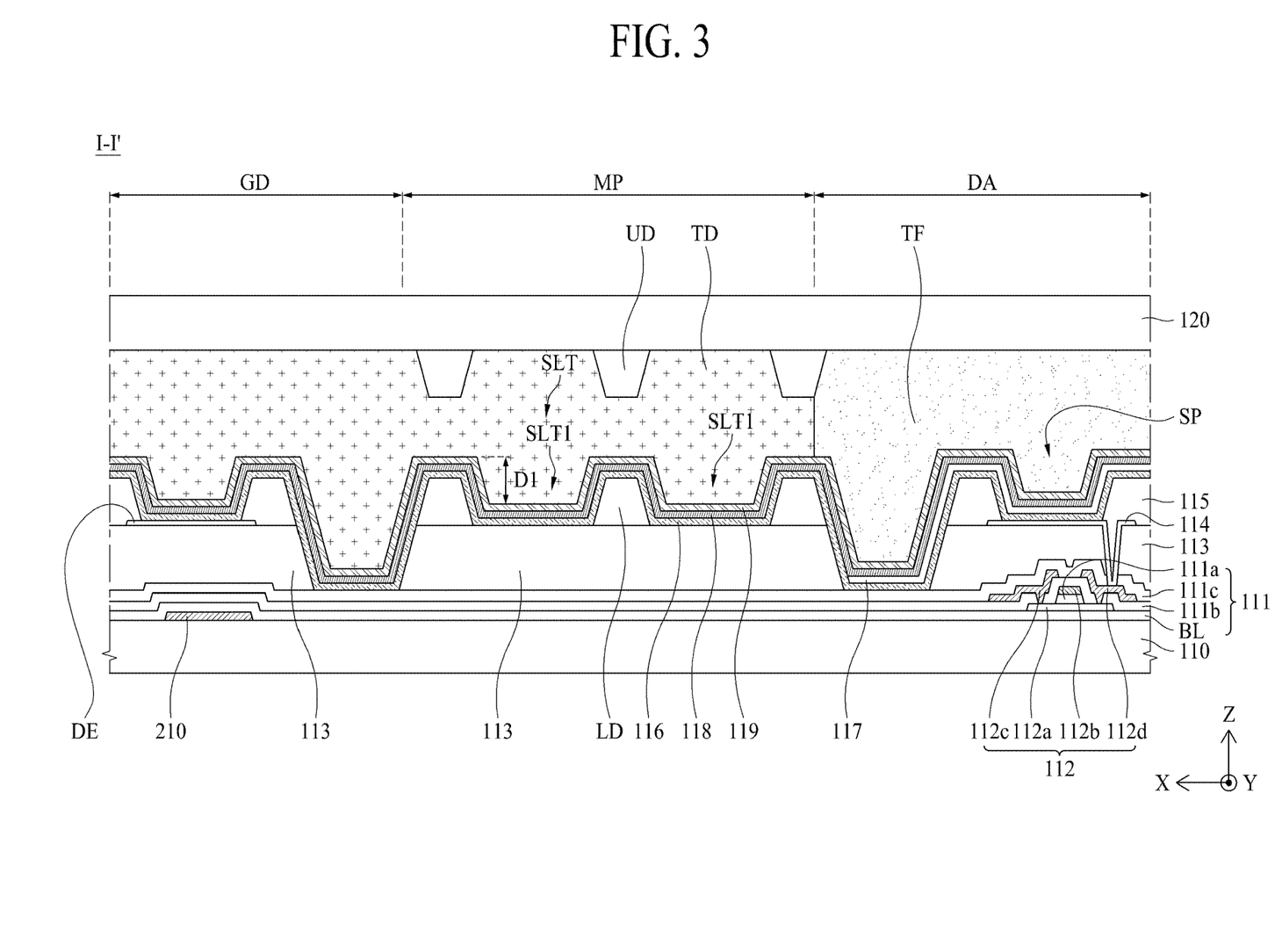
FIG. 3 is a cross-sectional view illustrating another example of line I-I' shown in FIG. 1.

FIG. 1 is a plan view illustrating a transparent display apparatus according to one embodiment of the present disclosure, FIG. 2 is a cross-sectional view illustrating an example of line I-I' shown in FIG. 1, and FIG. 3 is a cross-sectional view illustrating another example of line I-I' shown in FIG. 1.

Hereinafter, the following description will be based on that a transparent display apparatus 100 according to one embodiment of the present disclosure is an organic light emitting display apparatus, but is not limited thereto. That is, the transparent display apparatus according to one embodiment of the present disclosure may be implemented as any one of a liquid crystal display apparatus, a field emission display apparatus, a quantum dot lighting emitting diode apparatus, and an electrophoretic display apparatus as well as the organic light emitting display apparatus.

Referring to FIGS. 1 to 3, the transparent display apparatus 100 according to one embodiment of the present disclosure may include a display panel having a gate driver GD, a source drive integrated circuit (hereinafter, referred to as "IC") 130, a flexible film 140, a circuit board 150, and a timing controller 160.

The display panel may include a substrate 110 and an opposite substrate 120 (shown in FIG. 2), which are bonded to each other.

The substrate 110 may include a thin film transistor, and may be a transistor array substrate, a lower substrate, a base substrate, or a first substrate. The substrate 110 may be a transparent glass substrate or a transparent plastic substrate. For example, the substrate 110 may be a transparent glass substrate. Hereinafter, the substrate 110 will be defined as a first substrate.

The opposite substrate 120 may be bonded to the first substrate 110 via a transparent connection member TD. For example, the opposite substrate 120 may have a size smaller than that of the first substrate 110, and may be bonded to the remaining portion except the pad area of the first substrate 110. The transparent connection member TD may be an adhesive member (or transparent adhesive). The opposite substrate 120 may be an upper substrate, a second substrate, or an encapsulation substrate. The opposite substrate 120 may be bonded to a first surface of the first substrate 110 by a substrate bonding process using an adhesive member. Hereinafter, the opposite substrate 120 will be defined as a second substrate.

The first substrate 110 according to an example may include a display area DA and a non-display area NDA.

The display area DA is an area where an image is displayed, and may be a pixel array area, an active area, a pixel array unit, a display unit, or a screen. For example, the display area DA may be disposed at a central portion of the display panel DP.

The display area DA according to an example may include gate lines, data lines, pixel driving power lines, and a plurality of pixels P. Each of the plurality of pixels P may include a plurality of subpixels SP that may be defined by the gate lines and the data lines, and a transmissive portion TR disposed to be adjacent to some or all of the plurality of subpixels SP. The transmissive portion TR is an area provided to allow light to transmit front and rear surfaces of the display panel. Therefore, a user located in the direction of the front surface of the display panel may view an image or background positioned in the direction of the rear surface of the display panel through the transmissive portion TR.

Each of the plurality of subpixels SP may be defined as a minimum unit area in which light is actually emitted.

According to an example, at least four subpixels disposed to be adjacent to one another among the plurality of subpixels SP or four subpixels disposed to be adjacent to one another along a longitudinal direction of the gate line (or data line), and one transmissive portion TR constitute one unit pixel P. One unit pixel may include, but is not limited to, a red subpixel, a green subpixel, a blue subpixel, a white subpixel, and a transmissive portion TR. As an example, one unit pixel may include at least one red subpixel, at least one green subpixel, at least one blue subpixel, at least one white subpixel, and at least one transmissive portion TR.

According to another example, three subpixels disposed to be adjacent to one another among the plurality of subpixels SP or three subpixels disposed to be adjacent to one another along the longitudinal direction of the gate line (or data line), and one transmissive portion TR constitute one unit pixel. One unit pixel may include, but is not limited to, at least one red subpixel, at least one green subpixel, at least one blue subpixel, and at least one transmissive portion TR.

Each of the plurality of subpixels SP includes a thin film transistor and a light emitting portion connected to the thin film transistor. The light emitting portion may include a light emitting element layer (or organic light emitting layer) interposed between a first electrode and a second electrode.

The light emitting element layers respectively disposed in the plurality of subpixels SP may individually emit light of their respective colors different from one another or commonly emit white light. According to an example, when the light emitting element layers of the plurality of subpixels SP commonly emit white light, each of the red subpixel, the green subpixel and the blue subpixel may include a color filter (or wavelength conversion member) for converting white light into light of its respective different color. In this case, the white subpixel according to an example may not include a color filter. At least a portion of the white subpixel according to another example may include the same color filter as any one of the red subpixel, the green subpixel and the blue subpixel.

Each of the subpixels SP supplies a predetermined current to the organic light emitting element in accordance with a data voltage of the data line when a gate signal is input from the gate line by using the thin film transistor. For this reason, the light emitting portion of each of the subpixels may emit light with a predetermined brightness in accordance with the predetermined current. A structure of each of the subpixels SP will be described later with reference to FIG. 2.

The non-display area NDA may be an area where an image is not displayed, and may be a peripheral circuit area, a signal supply area, a non-active area, or a bezel area. The non-display area NDA may be configured to be around the display area DA. That is, the non-display area NDA may be disposed to surround the display area DA.

The transparent display apparatus 100 according to one embodiment of the present disclosure may include a gate driver GD provided in the non-display area NDA.

The gate driver GD supplies gate signals to the gate lines in accordance with the gate control signal input from the timing controller 160. The gate driver GD may be formed on the non-display area NDA outside one side of the display area DA of the display panel or both sides of the display area DA as shown in FIG. 1 in a gate driver in panel (GIP) method. Alternatively, the gate driver GD may be manufactured as a driving chip, packaged in a flexible film and attached to the non-display area NDA outside one side or both sides of the display area DA of the display panel DP by a tape automated bonding (TAB) method. A gate driver GD according to one example may include a plurality of gate driving circuits and a plurality of GIP lines 210 (shown in FIG. 3).

The plurality of gate driving circuits may be disposed on a left side of the display area DA, that is, a first non-display area and a right side of the display area DA, that is, a second non-display area. According to one example, the gate driving circuit disposed in the first non-display area may be electrically connected to each of gate lines disposed in the display area DA, and the gate driving circuit disposed in the second non-display area may be electrically connected to each of the gate lines disposed in the display area DA. For example, the gate driving circuit of the first non-display area may be connected to one side of each of the gate lines, and the gate driving circuit of the second non-display area may be connected to the other side of each of the gate lines.

According to another example, the gate driving circuit of the first non-display area may be electrically connected to odd-numbered (or even-numbered) gate lines of the gate lines disposed in the display area DA, and the gate driving circuit of the second non-display area may be electrically connected to even-numbered (or odd-numbered) gate lines of the gate lines disposed in the display area DA. For example, the gate driving circuit of the first non-display area may be connected to one side of each of the odd-numbered gate lines, and the gate driving circuit of the second non-display area may be connected to the other side of each of the even-numbered gate lines.

The plurality of gate driving circuits may output gate signals supplied from a plurality of pad portions and gate signals sequentially shifted based on gate circuit driving power sources. To this end, each of the plurality of gate driving circuits may include a plurality of GIP portions 200 (shown in FIG. 2). The GIP portion 200 may be a thin film transistor of a gate driver GD.

The transparent display apparatus 100 according to one embodiment of the present disclosure may further include a moisture permeation preventing portion MP.

The moisture permeation preventing portion MP according to one example may be disposed between the GIP portion 200 and the display area DA. In this case, the GIP portion 200 may refer to a GIP portion 200, which is disposed to be closest to the display area DA, among the plurality of GIP portions 200 of the gate driver GD. As a result, the moisture permeation preventing portion MP may be disposed between the gate driver GD and the display area DA. The moisture permeation preventing portion MP is to prevent water or moisture from being permeated from the outside of the first substrate 110 into the display area DA. Therefore, the moisture permeation preventing portion MP may be disposed to surround the display area DA to enhance anti-moisture permeability to the display area DA.

In case of a general transparent display apparatus, in order to prevent moisture from being permeated from the outside of the substrate into the display area, an inner dam is provided between an end of the substrate and the gate driver, and an outer dam is provided between the inner dam and the end of the substrate. Such an outer dam may be provided with a wide width to enhance moisture permeation preventing efficiency, which may increase a bezel width of the transparent display apparatus. When the bezel width of the transparent display apparatus is increased, an esthetic sense of the transparent display apparatus may be deteriorated, and when the plurality of transparent display apparatuses are disposed to be adjacent to each other, a seam may be recognized between the transparent display apparatuses, whereby integrity of an image may be deteriorated.

Therefore, in the transparent display apparatus 100 according to one embodiment of the present disclosure, the moisture permeation preventing portion MP is disposed between the GIP portion 200 of the gate driver GD and the display area DA, so that the outer dam disposed outside the gate driver may be omitted, whereby the bezel width may be reduced. Furthermore, the transparent display apparatus 100 according to one embodiment of the present disclosure may improve esthetic sense for a user due to a narrow bezel. In particular, even when a plurality of transparent display apparatuses are disposed to be adjacent to each other to implement a multi-transparent display apparatus, occurrence of a seam between the plurality of transparent display apparatuses may be avoided, whereby immersion of a user with respect to an image may be improved.

Hereinafter, a pixel P of the transparent display apparatus 100 according to one embodiment of the present disclosure will be described with reference to FIGS. 1 and 2.

Referring to FIGS. 1 and 2, the pixel P provided in the display area DA may include a plurality of subpixels SP and a transmissive portion TR. As shown in FIG. 1, the transmissive portion TR may be disposed to be adjacent to at least a portion of the plurality of subpixels SP. Each of the plurality of subpixels SP may include a buffer layer BL disposed on the first substrate 110 to prevent moisture permeation into the thin film transistor 112.

In addition, each of the subpixels SP according to one embodiment of the present disclosure may include an inorganic layer 111 provided on an upper surface of the buffer layer BL, including a gate insulating layer 111a, an interlayer insulating layer 111b and a passivation layer 111c, a planarization layer 113 provided on the inorganic layer 111, a first electrode 114 provided on the planarization layer 113, a bank 115, an organic light emitting layer 116, a second electrode 117, a capping layer 118, and an encapsulation layer 119.

A thin film transistor 112 for driving the subpixel SP may be disposed in the inorganic layer 111. The inorganic layer 111 may be expressed as a term of a circuit element layer. The buffer layer BL may be included in the inorganic layer 111 together with the gate insulating layer 111a, the interlayer insulating layer 111b and the passivation layer 111c. The first electrode 114, the organic light emitting layer 116 and the second electrode 117 may be included in the light emitting element.

The buffer layer BL may be formed between the first substrate 110 and the gate insulating layer 111a to protect the thin film transistor 112. The buffer layer BL may be disposed entirely on one surface (or front surface) of the first substrate 110. The buffer layer BL may serve to prevent a material contained in the first substrate 110 from being diffused into a transistor layer during a high temperature process of the manufacturing process of the thin film transistor. Optionally, the buffer layer BL may be omitted as the case may be.

The thin film transistor 112 according to an example may include an active layer 112a, a gate electrode 112b, a source electrode 112c, and a drain electrode 112d.

The active layer 112a may include a channel area, a drain area and a source area, which are formed in a thin film transistor area of a circuit area of the pixel P. The drain area and the source area may be spaced apart from each other with the channel area interposed therebetween.

The active layer 112a may be formed of a semiconductor material based on any one of amorphous silicon, polycrystalline silicon, oxide and organic material.

The gate insulating layer 111a may be formed on the channel area of the active layer 112a. As an example, the gate insulating layer 111a may be formed in an island shape only on the channel area of the active layer 112a, or may be formed on an entire front surface of the first substrate 110 or the buffer layer BL, which includes the active layer 112a.

The gate electrode 112b may be formed on the gate insulating layer 111a to overlap the channel area 111c of the active layer 112a.

The interlayer insulating layer 111b may be formed on the gate electrode 112b and the drain area and the source area of the active layer 112a. The interlayer insulating layer 111b may be formed in the circuit area and an entire light emission area, in which light is emitted to the pixel P. For example, the interlayer insulating layer 111b may be made of an inorganic material, but is not necessarily limited thereto.

The source electrode 112c may be electrically connected to the source area of the active layer 112a through a source contact hole provided in the interlayer insulating layer 111b overlapped with the source area of the active layer 112a.

The drain electrode 112d may be electrically connected to the drain area of the active layer 112a through a drain contact hole provided in the interlayer insulating layer 111b overlapped with the drain area of the active layer 112a.

The drain electrode 112d and the source electrode 112c may be made of the same metal material. For example, each of the drain electrode 112d and the source electrode 112c may be made of a single metal layer, a single layer of an alloy or a multi-layer of two or more layers, which is the same as or different from that of the gate electrode.

In addition, the circuit area may further include first and second switching thin film transistors disposed together with the thin film transistor 112, and a capacitor. Since each of the first and second switching thin film transistors is provided on the circuit area of the pixel P to have the same structure as that of the thin film transistor 112, its description will be omitted. The capacitor may be provided in an overlap area between the gate electrode 112b and the source electrode 112c of the thin film transistor 112, which overlap each other with the interlayer insulating layer 111b interposed therebetween.

Additionally, in order to prevent a threshold voltage of the thin film transistor provided in a pixel area from being shifted by light, the display panel or the first substrate 110 may further include a light shielding layer (not shown) provided below the active layer 112a of at least one of the thin film transistor 112, the first switching thin film transistor or the second switching thin film transistor. The light shielding layer may be disposed between the first substrate 110 and the active layer 112a to shield light incident on the active layer 112a through the first substrate 110, thereby minimizing a change in the threshold voltage of the transistor due to external light.

The protective layer 111c may be provided on the first substrate 110 to cover the pixel area. The protective layer 111c covers the drain electrode 112d and the source electrode 112c of the thin film transistor 112 and the interlayer insulating layer 111b. The protective layer 111c may be entirely formed in the circuit area and the light emission area. For example, the protective layer 111c may be expressed as a passivation layer. The protective layer 111c may be omitted.

The planarization layer 113 may be formed on the first substrate 110 to cover the protective layer 111c. When the protective layer 111c is omitted, the planarization layer 113 may be provided on the first substrate 110 to cover the circuit area. The planarization layer 113 may be formed entirely in the circuit area and the light emission area. In addition, the planarization layer 113 may be formed on the other area except the pad area in the non-display area NDA and the entire display area DA. For example, the planarization layer 113 may include an extension portion (or enlarged portion) extended or enlarged from the display area DA to the other non-display area NDA except the pad area. Therefore, the planarization layer 113 may have a size relatively wider than that of the display area DA. Referring to FIG. 2, the planarization layer 113 may be disposed even in the gate driver GD of the non-display area NDA and the moisture permeation preventing portion MP of the non-display area NDA. Since the planarization layer 113 disposed in the non-display area NDA is made of the same material as that of the planarization layer 113 provided in the display area DA, the visibility difference between the non-display area NDA and the display area DA may be reduced.

The planarization layer 113 according to an example may be formed to be relatively thick, and thus may provide a flat surface on the display area DA and the non-display area NDA. For example, the planarization layer 113 may be made of an organic material such as photo acryl, benzocyclobutene, polyimide, and fluorine resin.

Meanwhile, the GIP portion 200 disposed in the gate driver GD may be provided in a structure similar to that of each of an active layer 112a of the thin film transistor 112 of the pixel P, the gate electrode 112b disposed on the gate insulating layer 111a covering the active layer 112a, and a drain electrode 112d and a source electrode 112c, which are disposed on the interlayer insulating layer 111b covering the gate electrode 112b.

Therefore, the GIP portion 200 may include an active layer 200a, a gate electrode 200b disposed on the gate insulating layer 111a covering the active layer 200a, and a drain electrode 200d and a source electrode 200c, which are disposed on the interlayer insulating layer 111b covering the gate electrode 200b.

As shown in FIG. 2, the passivation layer 111c may be disposed on the source electrode 200c and the drain electrode 200d of the GIP portion 200, and the planarization layer 113 may be disposed on the passivation layer 111c.

In the subpixel SP of FIG. 2, the first electrode 114 is connected to the drain electrode 112d of the thin film transistor 112 through a contact hole formed in the planarization layer 113 and the passivation layer 111c. However, in the moisture permeation preventing portion MP of FIG. 2, the drain electrode 200d of the GIP portion 200 is not connected to the first electrode (or dummy electrode DE) provided on the planarization layer 113 of the non-display area NDA. This is because that a voltage does not need to be supplied to the dummy electrode DE because the organic light emitting layer 116 does not emit light in the non-display area NDA. The dummy electrode DE may be formed of the same material as that of the first electrode 114 of the subpixel SP through the same process as that of the first electrode 114 of the subpixel SP. The dummy electrode DE disposed in the gate driver GD is provided to be similar to the first electrode 114 of the subpixel SP, so that a difference in visibility between the non-display area NDA and the display area DA may be reduced.

FIG. 3 is a cross-sectional view illustrating another example of line I-I' shown in FIG. 1.

Although only the plurality of GIP portions 200 provided in the gate driver GD are described in FIG. 2, a plurality of GIP lines 210 may be provided in the gate driver GD. Therefore, another example of FIG. 3 is a cross-sectional view illustrating the GIP line 210 of the gate driver GD and a moisture permeation preventing portion MP adjacent to the GIP line 210.

In more detail, the gate driver GD may include a plurality of GIP lines 210 near the plurality of GIP portions 200, for example, lines for supplying a signal or a power source, as well as the plurality of GIP portions 200, and the moisture permeation preventing portion MP may be disposed between the GIP line 210 and the display area DA as shown in FIG. 3.

Since the moisture permeation preventing portion MP shown in FIG. 3 is the same as the moisture permeation preventing portion MP shown in FIG. 2 except that the moisture permeation preventing portion MP is surrounded by the GIP line 210 between the gate driver GD and the display area DA, its detailed description will be omitted. Hereinafter, the description will be based on a difference from the moisture permeation preventing portion MP shown in FIG. 2.

The GIP line 210 shown in FIG. 3 may be disposed between the first substrate 110 and the buffer layer BL. This is because that the GIP line 210 is formed together with an LS line (or common voltage supply line) (not shown) when the LS line is formed between the first substrate 110 and the buffer layer BL of the display area DA. Therefore, as shown in FIG. 3, the GIP line 210 may be disposed between the buffer layer BL and the first substrate 110, but is not limited thereto.

Since the plurality of GIP lines 210 positioned in different layers may be positioned near the GIP portion 200, the moisture permeation preventing portion MP may be surrounded by a plurality of GIP lines (not shown) positioned in another layer, not the GIP line 210 disposed between the first substrate 110 and the buffer layer BL. For example, the plurality of GIP lines 210 positioned in another layer may be any one of lines disposed between the buffer layer BL and the gate insulating layer 111a, lines disposed between the gate insulating layer 111a and the interlayer insulating layer 111b and lines disposed between the interlayer insulating layer 111b and the passivation layer 111c. In the case that the plurality of GIP lines 210 are disposed between the gate insulating layer 111a and the interlayer insulating layer 111b, the plurality of GIP lines 210 may be formed together with the gate electrode 112b of the display area DA when the gate electrode 112b of the display area DA is formed, and in the case that the plurality of GIP lines 210 are disposed between the interlayer insulating layer 111b and the passivation layer 111c, the plurality of GIP lines 210 may be formed together with the source electrode 112c and the drain electrode 112d of the display area DA when the source electrode 112c and the drain electrode 112d of the display area DA are formed. As a result, the transparent display apparatus 100 according to one embodiment of the present disclosure may be provided such that the moisture permeation preventing portion MP is surrounded by at least one of the GIP portion 200 or the GIP line 210 between the gate driver GD and the display area DA.

Meanwhile, as shown in FIGS. 2 and 3, the planarization layer 113 may be provided to be removed formed between the GIP portion 200 (or GIP line 210) and the moisture permeation preventing portion MP. Therefore, light transmittance may be more enhanced between the GIP portion 200 and the moisture permeation preventing portion MP than an area where the planarization layer 113 is provided. Therefore, the area from which the planarization layer 113 between the GIP portion 200 and the moisture permeation preventing portion MP is removed may have the same or similar function as or to that of the transmissive portion TR of the display area DA. The area from which the planarization layer 113 between the GIP portion 200 and the moisture permeation preventing portion MP is removed may be expressed as a transmissive portion of the gate driver GD.

Similarly, the planarization layer 113 may be provided to be removed between the moisture permeation preventing portion MP and the subpixel SP. Therefore, light transmittance may be more enhanced between the moisture permeation preventing portion MP and the subpixel SP than the area where the planarization layer 113 is provided. Therefore, the area from which the planarization layer 113 between the moisture permeation preventing portion MP and the subpixel SP is removed may have the same or similar function as or to that of the transmissive portion TR of the display area DA. The area from which the planarization layer 113 between the moisture permeation preventing portion MP and the subpixel SP is removed may be the transmissive portion TR of the pixel P. Therefore, in the transparent display apparatus 100 according to one embodiment of the present disclosure, the transmissive portion may be provided to surround the moisture permeation preventing portion MP, and thus the difference in visibility from the display area DA of the transmissive portion TR may be further reduced.

Referring back to FIG. 2, the first electrode 114 of the subpixel SP may be formed on the planarization layer 113. The first electrode 114 is connected to the drain electrode or the source electrode of the thin film transistor 112 through a contact hole that passes through the planarization layer 113 and the protective layer 111c.

The first electrode 114 may be made of at least one of a transparent metal material, a semi-transmissive metal material, or a metal material having high reflectance.

When the transparent display apparatus 100 is provided in a top emission mode, the first electrode 114 may be formed of a metal material having high reflectance or a stacked structure of a metal material having high reflectance and a transparent metal material. For example, the first electrode 114 may be formed of a metal material having high reflectance, such as a stacked structure (Ti/Al/Ti) of aluminum and titanium, a stacked structure (ITO/Al/ITO) of aluminum and ITO, an Ag alloy, and a stacked structure (ITO/Ag alloy/ITO) of Ag alloy and ITO. The Ag alloy may be an alloy of such as silver (Ag), palladium (Pd), and copper (Cu).

When the transparent display apparatus 100 is provided in a bottom emission mode, the first electrode 114 may be formed of a transparent conductive material (TCO) such as ITO and IZO, which may transmit light, or a semi-transmissive conductive material such as magnesium (Mg), silver (Ag) or an alloy of magnesium (Mg) and silver (Ag).

Meanwhile, the material constituting the first electrode 114 may include MoTi. The first electrode 114 may be an anode electrode or a pixel electrode.

The bank 115 is a non-light emission area in which light is not emitted, and may be provided to surround each of light emission areas (or light emitting portions) of the plurality of subpixels SP. That is, the bank 115 may partition (or define) the respective light emission areas (or light emitting portions).

The bank 115 may be formed on the planarization layer 113 to cover an edge of the first electrode 114, thereby partitioning (or defining) the light emission areas (or light emitting portions) of the plurality of subpixels SP.

The bank 115 may be formed to cover the edge of the first electrode 114 of each of the subpixels SP and expose a portion of each of the first electrodes 114. Therefore, a current is concentrated on an end of each of the first electrodes 114 to avoid a problem in which light emitting efficiency is degraded. An exposed portion of the first electrode 114 that is not covered by the bank 115 may be a light emission area (or light emitting portion).

The bank 115 may be formed of an organic layer such as an acrylic resin, an epoxy resin, a phenolic resin, a polyamide resin, and a polyimide resin, but is not limited thereto.

The organic light emitting layer 116 is formed on the first electrode 114 and the bank 115. When a voltage is applied to the first electrode 114 and the second electrode 117, holes and electrons move to the organic light emitting layer 116, respectively, and are combined with each other in the organic light emitting layer 116 to emit light.

The organic light emitting layer 116 may be formed of a plurality of subpixels SP and a common layer provided on the bank 115. In this case, the organic light emitting layer 116 may be provided in a tandem structure in which a plurality of light emitting layers, for example, a yellow-green light emitting layer and a blue light emitting layer are stacked, and may emit white light when an electric field is formed between the first electrode 114 and the second electrode 117.

A color filter (not shown) suitable for a color of a corresponding subpixel SP may be formed on the second substrate 120. For example, a red color filter may be provided in a red subpixel, a green color filter may be provided in a green subpixel, and a blue color filter may be provided in a blue subpixel. A white subpixel may not include a color filter because the organic light emitting layer 116 emits white light.

However, the present disclosure is not limited to the above example, and the organic light emitting layer 116 may include a red light emitting layer for emitting red light from the first subpixel, a green light emitting layer for emitting green light from the second subpixel, a blue light emitting layer for emitting blue light from the third subpixel, and a white light emitting layer for emitting white light from the fourth subpixel, without being provided as a common layer. In this case, since the organic light emitting layer 116 is provided to emit light of colors different for each of the subpixels SP, a color filter may not be formed on the second substrate 120.

The second electrode 117 is formed on the organic light emitting layer 116. The second electrode 117 may be a common layer commonly formed in the subpixels SP. The second electrode 117 may be made of a transparent metal material, a semi-transmissive metal material or a metal material having high reflectance.

When the transparent display apparatus 100 is provided in a top emission mode, the second electrode 117 may be formed of a transparent conductive material (TCO) such as ITO and IZO, which may transmit light, or a semi-transmissive conductive material such as magnesium (Mg), silver (Ag) or an alloy of magnesium (Mg) and silver (Ag).

When the transparent display apparatus 100 is provided in a bottom emission mode, the second electrode 117 may be formed of a metal material having high reflectance, such as a stacked structure (Ti/Al/Ti) of aluminum and titanium, a stacked structure (ITO/Al/ITO) of aluminum and ITO, an Ag alloy and a stacked structure (ITO/Ag alloy/ITO) of Ag alloy and ITO. The Ag alloy may be an alloy of silver (Ag), palladium (Pd), copper (Cu), etc. The second electrode 117 may be a counter electrode or a cathode electrode.

Figure 5:
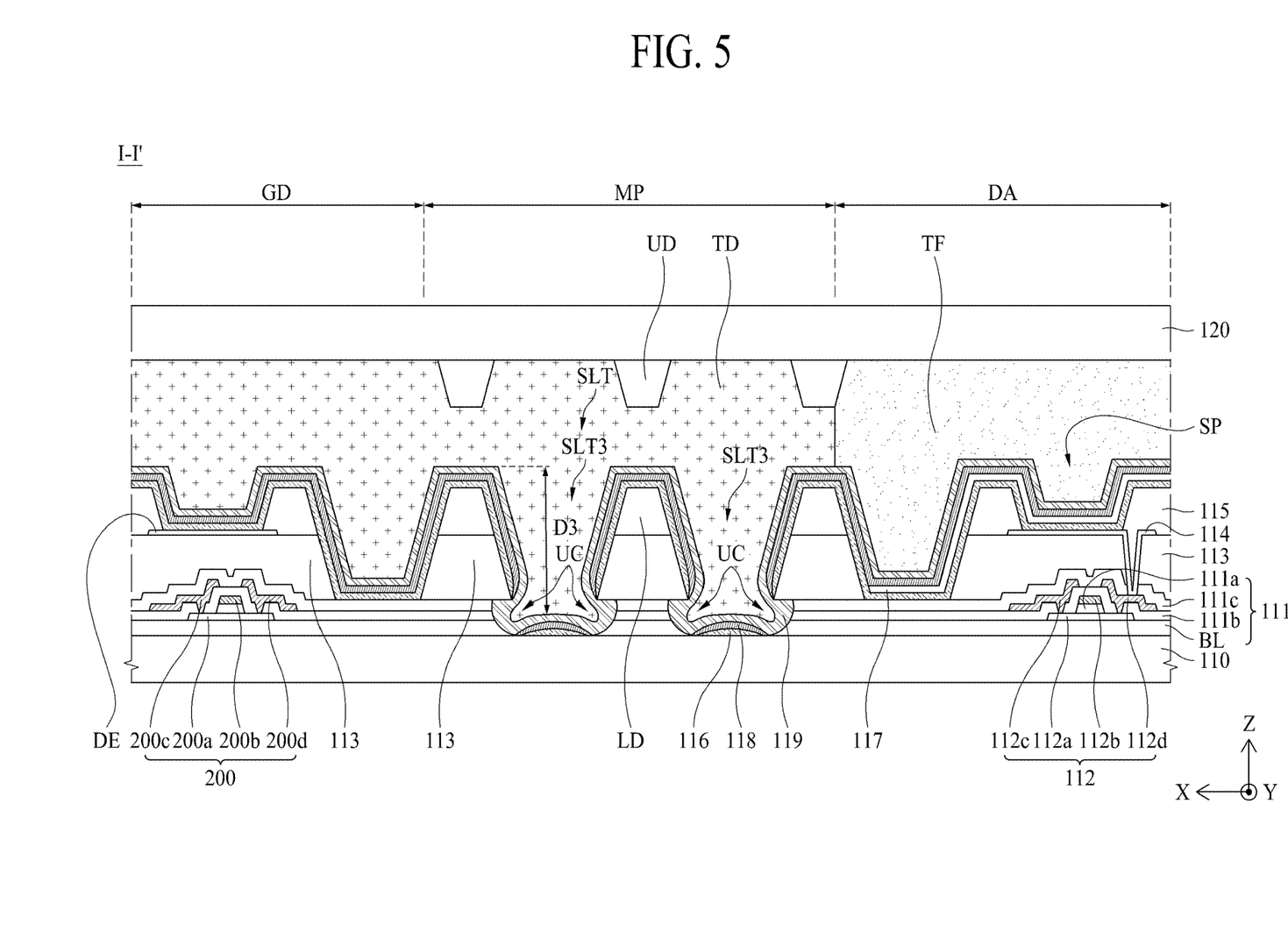
FIG. 5 is a cross-sectional view illustrating a transparent display apparatus according to another embodiment.

The capping layer 118 may be formed on the second electrode 117, but may be omitted. When the capping layer 118 is formed, the capping layer 118 may be formed on the entire display area DA. Also, as shown in FIG. 2, the capping layer 118 may be disposed to reach the moisture permeation preventing portion MP and the gate driver GD of the non-display area NDA. In this case, the capping layer 118 provided in the moisture permeation preventing portion MP may reduce the difference in visibility from the display area DA. The capping layer 118 may be formed integrally without being disconnected from the non-display area NDA, but is not limited thereto, and the capping layer 118 may be partially disconnected from the moisture permeation preventing portion MP as shown in FIG. 5.

The encapsulation layer 119 is formed on the capping layer 118. The encapsulation layer 119 serves to prevent oxygen or water from being permeated into the organic light emitting layer 116 and the second electrode 117. To this end, the encapsulation layer 119 may include at least one inorganic layer.

In the transparent display apparatus 100 according to one embodiment of the present disclosure, as shown in FIG. 2, the encapsulation layer 119 may be disposed in the non-display area NDA as well as the display area DA. The encapsulation layer 119 according to one example may be disposed between a transparent filling member TF and the capping layer 118 in the display area DA, and may be disposed between a transparent connection member TD and the capping layer 118 disposed on the buffer layer BL in the moisture permeation preventing portion MP and the gate driver GD of the non-display area NDA. Meanwhile, when the capping layer 118 is disconnected from the moisture permeation preventing portion MP as shown in FIG. 5, the encapsulation layer 119 may be in contact with at least a portion of the inorganic layer 111.

Since the encapsulation layer 119 is disposed in the display area DA and extended to the non-display area NDA, the encapsulation layer 119 may be in contact with at least a portion of an outer dam OD in an outer area OA of the display panel. Therefore, the transparent display apparatus 100 according to one embodiment of the present disclosure may effectively prevent moisture, such as water, from being permeated toward the display area DA due to the outer dam OD disposed in the outer area OA of the display panel.

As shown in FIG. 2, the encapsulation layer 119 may be in contact with the transparent filling member TF in the display area DA, and may be in contact with the transparent connection member TD in the non-display area NDA. Therefore, in order to increase an overall bonding force between the first substrate 110 and the second substrate 120, the encapsulation layer 119 may be made of a material having a large adhesive force with at least one of the transparent filling member TF or the transparent connection member TD.

As a result, the transparent display apparatus 100 according to one embodiment of the present disclosure may have a structural feature in which a plurality of lower dams LD provided in the moisture permeation preventing portion MP of the non-display area NDA overlap the transparent connection member TD in a thickness direction of the first substrate 110, but is not limited thereto. A portion of the plurality of lower dams LD of the moisture permeation preventing portion MP may overlap the transparent filling member TF. This is because that the transparent filling member TF may be disposed to be further permeated toward the moisture permeation preventing portion MP when the first substrate 110 and the second substrate 120 are bonded to each other.

The transparent display apparatus 100 according to one embodiment of the present disclosure may further include a transparent connection member TD and a transparent filling member TF.

The transparent connection member TD may be disposed between the first substrate 110 and the second substrate 120. Therefore, the first substrate 110 and the second substrate 120 may be bonded to each other by means of the transparent connection member TD. For example, the transparent connection member TD may include a thermosetting transparent adhesive or a light curable transparent adhesive. The transparent connection member TD may contain an absorbent material (not shown) for absorbing external water or moisture permeated into the display area DA.

As shown in FIG. 2, the transparent connection member TD according to one example may be disposed between the plurality of lower dams LD and the second substrate 120. The transparent connection member TD may be disposed to fill a gap between the first substrate 110 and the second substrate 120, which are disposed in the moisture permeation preventing portion MP. Therefore, the transparent connection member TD may prevent water and the like from being permeated into the display area DA through the gap between the first substrate 110 and the second substrate 120.

The transparent connection member TD may surround the display area DA, and may be directly in contact with the encapsulation layer 119 disposed in the non-display area NDA. Also, as shown in FIG. 2, the transparent connection member TD may be disposed in the moisture permeation preventing portion MP to overlap the plurality of lower dams LD. The plurality of lower dams LD may prevent the transparent connection member TD disposed in the moisture permeation preventing portion MP from overflowing toward the display area DA. The plurality of lower dams LD may prevent the transparent connection member TD disposed in the moisture permeation preventing portion MP from excessively overflowing toward the gate driver GD. The transparent connection member TD may overlap a plurality of upper dams UD provided in the moisture permeation preventing portion MP.

In FIGS. 1 to 3, the plurality of lower dams LD and the plurality of upper dams UD are provided as three, respectively, but are not limited thereto. The plurality of lower dams LD and the plurality of upper dams UD may be provided as three or more, respectively.

The transparent filling member TF may be disposed in the display area DA to be adjacent to the transparent connection member TD. The transparent filling member TF may be disposed to fill the gap between the first substrate 110 and the second substrate 120, which are disposed in the display area DA, thereby supporting the first substrate 110 and the second substrate 120. Therefore, the transparent filling member TF may prevent the first substrate 110 and the second substrate 120, which are disposed in the display area DA, from being easily deformed by an external force. In addition, the transparent filling member TF may be provided to be disposed between the organic light emitting layer 116 formed in the first substrate 110 and the second substrate 120, so that external water or moisture permeated through the second substrate 120 may be prevented from reaching the organic light emitting layer 116. That is, the transparent filling member TF may have a barrier function for blocking water permeation. The transparent fill member TF may further contain an absorbent material for absorbing water or moisture to enhance a moisture permeation preventing effect. For example, the absorbent material may be a getter.

Meanwhile, the transparent fill member TF may include a thermosetting transparent adhesive or a light curable transparent adhesive. In this case, the transparent filling member TF may be used together with the transparent connection member TD to bond the first substrate 110 and the second substrate 120 to each other. Therefore, the bonding force between the first substrate 110 and the second substrate 120 may be further improved.

The transparent filling member TF may be surrounded by the transparent connection member TD, and may be directly in contact with the encapsulation layer 119 disposed in the display area DA. The transparent filling member TF may be disposed in the display area DA to overlap the plurality of pixels P.

The transparent filling member TF may be disposed to be adjacent to the lower dam LD and the upper dam UD, which are provided in the moisture permeation preventing portion MP. In this case, overflowing of the transparent filling member TF toward the moisture permeation preventing portion MP may be minimized when the first substrate 110 and the second substrate 120 are bonded to each other. As a result, the plurality of lower dams LD and the plurality of upper dams UD may prevent at least one of the transparent connection member TD or the transparent filling member TF from overflowing so that the transparent connection member TD and the transparent filling member TF are positioned at a boundary portion between the moisture permeation preventing portion MP and the display area DA.

Hereinafter, the moisture permeation preventing portion MP will be described in detail with reference to FIGS. 1 to 3.

The moisture permeation preventing portion MP according to one example may include a plurality of lower dams LD. The plurality of lower dams LD may be disposed to surround the display area DA on the substrate 110. The plurality of lower dams LD may be disposed to be spaced apart from each other between the GIP portion 200 and the display area DA, that is, in the non-display area NDA.

The plurality of lower dams LD may be formed to be protruded from the planarization layer 113 of the first substrate 110 in a direction in which the first substrate 110 and the second substrate 120 are bonded to each other. Therefore, the plurality of lower dams LD may block a portion of the edge of the transparent connection member TD disposed in the moisture permeation preventing portion MP, thereby preventing the transparent connection member TD from overflowing toward the display area DA. The plurality of lower dams LD may be made of an inorganic material to prevent moisture permeation, but is not limited thereto. The plurality of lower dams LD may be formed of the same material as that of the bank 115 through the same process as that of the bank 115.

The plurality of lower dams LD according to one example may be disposed between the GIP portion 200 and the display area DA, that is, in the moisture permeation preventing portion MP. Therefore, the plurality of lower dams LD may prevent water from being permeated from the gate driver GD into the display area DA. Further, the plurality of lower dams LD are provided to fill a gap with the second substrate 120 together with the transparent connection member TD, thereby maximizing anti-moisture permeation to the display area DA.

The transparent display apparatus 100 according to one embodiment of the present disclosure may further include a plurality of upper dams UD.

The plurality of upper dams UD may be disposed in the moisture permeation preventing portion MP. The plurality of upper dams UD according to one example may be provided on the second substrate 120. The plurality of upper dams UD may be provided to be protruded from the second substrate 120 in a direction in which the first substrate 110 and the second substrate 120 are bonded to each other. Therefore, the plurality of upper dams UD and the plurality of lower dams LD may prevent the transparent connection member TD from flowing toward the display area DA from the moisture permeation preventing portion MP.

The plurality of upper dams UD may be disposed to be spaced apart from each other on the second substrate 120. The plurality of upper dams UD may be disposed to at least partially overlap the plurality of lower dams LD. The plurality of upper dams UD may be disposed to overlap (or face) the plurality of lower dams LD, so that the gap between the first substrate 110 and the second substrate 120 may be reduced. Therefore, moisture permeation from the gate driver GD to the display area DA may be further avoided. In addition, the plurality of upper dams UD are disposed to overlap (face) the plurality of lower dams LD, thereby preventing the transparent connection member TD disposed in the moisture permeation preventing portion MP from overflowing toward the display area DA.

As shown in FIG. 2, the plurality of upper dams UD may be provided to be matched with each of the plurality of lower dams LD one-to-one, but are not limited thereto. The plurality of upper dams UD may be disposed one by one per two lower dams LD. That is, the number of the plurality of upper dams UD may be the same as or smaller than the plurality of lower dams LD. When the plurality of upper dams UD are provided in the same number as the plurality of lower dams LD, moisture permeation from the gate driver GD to the display area DA may be avoided more effectively than the case that the number of plurality of lower dams LD is smaller than the upper dams UD. When the plurality of upper dams UD are provided to be smaller than the plurality of lower dams LD, difficulty in a process of aligning each of the plurality of upper dams UD with each of the plurality of lower dams LD may be reduced. That is, a process deviation may be reduced.

The plurality of upper dams UD may be made of a transparent material. As shown in FIGS. 1 and 2, since the plurality of upper dams UD, which are disposed to overlap the plurality of lower dams LD, are longitudinally disposed in a stripe shape, they are different in shape from the bank 115 of the pixel SP. Also, when the plurality of upper dams UD are made of an opaque material, the plurality of upper dams UD may be visible to a user. Therefore, in the transparent display apparatus 100 according to one embodiment of the present disclosure, the plurality of upper dams UD are provided to be transparent, so that the upper dams UD having different shapes between the gate driver GD and the display area DA may be prevented from being visible to the user. Therefore, the transparent display apparatus 100 according to one embodiment of the present disclosure may improve integrity between the display area DA and the non-display area NDA.

Referring back to FIG. 2, the moisture permeation preventing portion MP may be provided in a structure similar to that of the pixel P in order to reduce the difference in visibility from the display area DA. The moisture permeation preventing portion MP according to one example may include a buffer layer BL disposed on an upper surface of the first substrate 110, a gate insulating layer 111a disposed on an upper surface of the buffer layer BL, an interlayer insulating layer 111b disposed on an upper surface of the gate insulating layer 111a, a passivation layer 111c disposed on an upper surface of the interlayer insulating layer 111b, and a planarization layer 113 disposed on an upper surface of the passivation layer 111c. A plurality of lower dams LD, which are spaced apart from each other, may be disposed on an upper surface of the planarization layer 113. Therefore, the planarization layer 113 may be disposed between the first substrate 110 and the plurality of lower dams LD.

The plurality of lower dams LD may be disposed to be spaced apart from each other on the upper surface of the planarization layer 113, and thus may be similar to a structure of the subpixel SP of the display area DA. Therefore, the difference in visibility between the display area DA and the moisture permeation preventing portion MP may be reduced. However, since the moisture permeation preventing portion MP does not emit light, the moisture permeation preventing portion MP may not include the first electrode 114 but is not limited thereto. The moisture permeation preventing portion MP may further include a dummy electrode between the plurality of lower dams LD, thereby reducing the difference in visibility from the display area DA.

Meanwhile, as shown in FIG. 2, the planarization layer 113 provided in the moisture permeation preventing portion MP may be provided as one layer without being disconnected. That is, the planarization layer 113 provided in the moisture permeation preventing portion MP may be provided between the plurality of lower dams LD so as not to be disconnected. Therefore, the organic light emitting layer 116, the capping layer 118 and the encapsulation layer 119, which are disposed on the planarization layer 113 of the moisture permeation preventing portion MP, may be disposed at substantially the same height as the organic light emitting layer 116, the capping layer 118 and the encapsulation layer 119 of the display area DA. Therefore, the difference in visibility between the moisture permeation preventing portion MP and the display area DA may be further reduced.

In the transparent display apparatus 100 according to one embodiment of the present disclosure, the organic light emitting layer 116 provided in the pixel P may be disposed to be extended in the moisture permeation preventing portion MP. This is to reduce the difference in visibility between the display area DA and the non-display area NDA as the moisture permeation preventing portion MP disposed in the non-display area NDA is provided in a structure similar to that of the pixel P of the display area DA.

In more detail, as shown in FIG. 2, the organic light emitting layer 116 may be provided to cover the upper surface and sides of the plurality of lower dams LD, the upper surface of the planarization layer 113 provided between the lower dams LD, and the sides of the planarization layer 113 adjacent to each of the display area DA and the gate driver GD. Therefore, the organic light emitting layer 116 provided in the moisture permeation preventing portion MP may reduce the difference in visibility from the display area DA. The capping layer 118 and the encapsulation layer 119 may be disposed on the organic light emitting layer 116 provided in the moisture permeation preventing portion MP.

Although the second electrode 117 is not disposed between the organic light emitting layer 116 of the moisture permeation preventing portion MP and the capping layer 118 in FIG. 2, the second electrode 117 may be provided to have the same profile as that of the organic light emitting layer 116 in order to reduce the difference in visibility from the display area DA.

Referring back to FIGS. 2 and 3, a slit portion SLT may be provided between the plurality of lower dams LD. As shown in FIG. 2, the slit portion SLT may be provided in the form of a concave groove as the plurality of lower dams LD are disposed to be spaced apart from each other on the planarization layer 113. For example, the lower dam LD may be provided as a plurality of lower dams by being patterned through a photolithography process and an etching process after a material constituting the lower dam is deposited on the planarization layer 113. Therefore, the slit portion SLT in the form of a concave groove may be provided such that its width becomes narrower from the second substrate 120 toward the first substrate 110. Since the slit portion SLT is disposed between the plurality of lower dams LD, the moisture permeation preventing portion MP may include a plurality of slit portions SLT.

The organic light emitting layer 116 provided between the GIP portion 200 and the display area DA, that is in the moisture permeation preventing portion MP may have a path, which is longer than the case that there is no slit portion, due to the plurality of slit portions SLT in the form of a concave groove. Therefore, the transparent display apparatus 100 according to one embodiment of the present disclosure has a longer path of the organic light emitting layer 116 due to the plurality of slit portions SLT, thereby reducing or avoiding moisture permeation through the organic light emitting layer 116 as compared with the case that there is no slit portion.

Since FIGS. 2 and 3 relate to a transparent display apparatus 100 according to one embodiment of the present disclosure, the plurality of slit portions shown in FIGS. 2 and 3 may be expressed as a first slit portion SLT1. Since the first slit portion SLT1 is a recess groove provided between the plurality of lower dams LD, the first slit portion SLT1 may be expressed as a slit of the lower dam.

Figure 4:
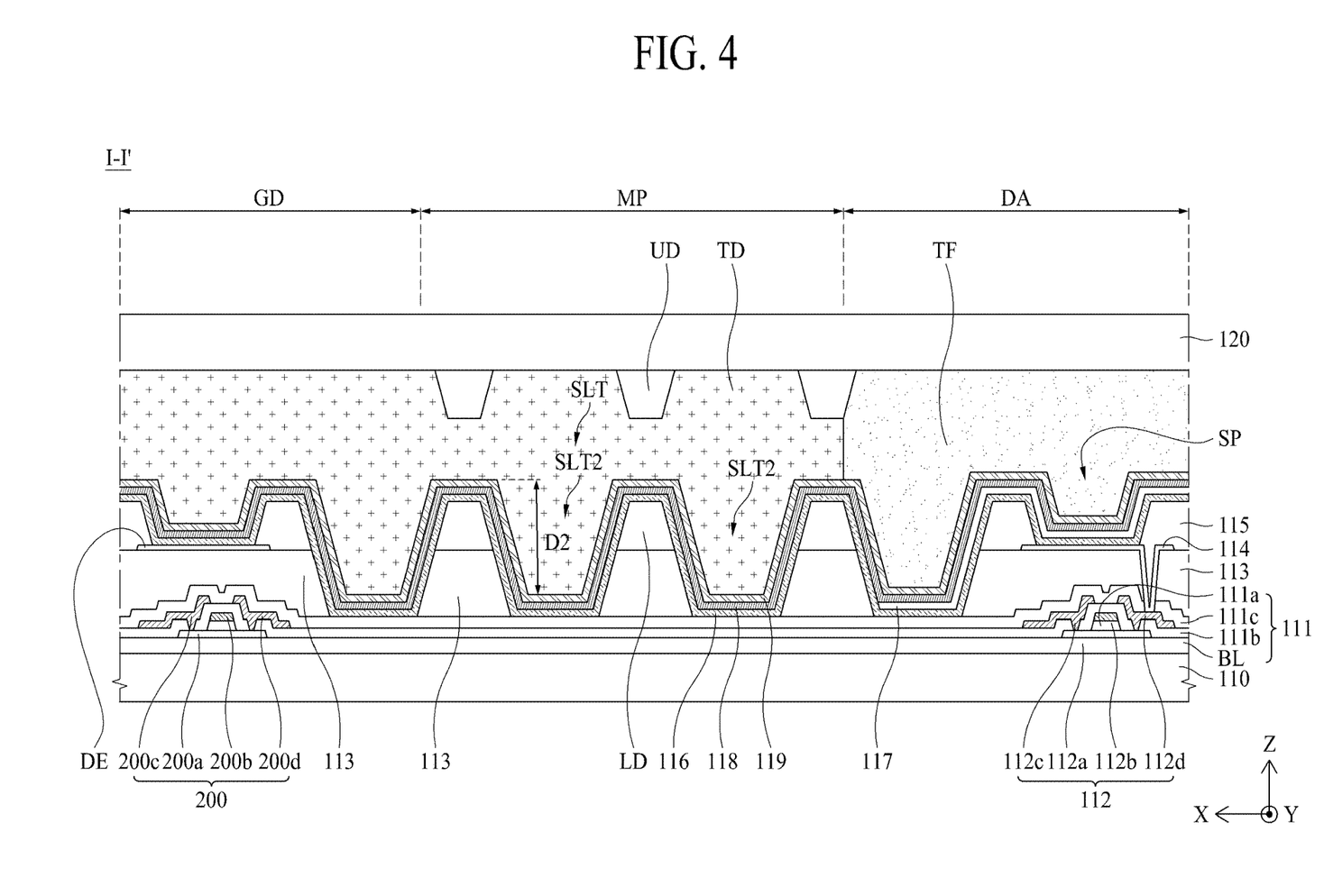
FIG. 4 is a cross-sectional view illustrating a transparent display apparatus according to another embodiment.

FIG. 4 is a cross-sectional view illustrating a transparent display apparatus according to another embodiment.

Referring to FIG. 4, the transparent display apparatus 100 according to another embodiment of the present disclosure is the same as the transparent display apparatus of FIGS. 1 to 3 except that the structure of the planarization layer 113 of the moisture permeation preventing portion MP is changed. Therefore, the same reference numerals will be given to the same elements, and the following description will be based on a difference from the transparent display apparatus of FIGS. 1 to 3.

In case of the transparent display apparatus according to FIG. 1, the planarization layer 113 of the moisture permeation preventing portion MP is provided as a single layer without being disconnected, and a plurality of lower dams LD are disposed to be spaced apart from each other on the planarization layer 113. Therefore, in case of the transparent display apparatus according to FIG. 1, the gap between the first substrate 110 and the second substrate 120 may be reduced due to the plurality of lower dams LD provided on the planarization layer 113. Therefore, the moisture permeation preventing portion MP may prevent water and the like from being permeated into the display area DA from the gate driver GD (or the outside of the display panel).

Also, in case of the transparent display apparatus according to FIG. 1, due to the plurality of first slit portions SLT1 disposed in the moisture permeation preventing portion MP, the organic light emitting layer 116 may be provided to cover the upper surface and sides of each of the lower dams LD and the upper surface of the planarization layer 113 disposed between the lower dams LD. Therefore, since the path of the organic light emitting layer 116 is lengthened as compared with the case that there is no slit portion, moisture permeation through the organic light emitting layer 116 may be reduced or avoided. In the transparent display apparatus of FIG. 1, since the organic light emitting layer 116 of the moisture permeation preventing portion MP may be provided at substantially the same height as that of the organic light emitting layer 116 of the display area DA, the difference in visibility between the moisture permeation preventing portion MP and the display area DA may be reduced. As a result, in case of the transparent display apparatus according to FIG. 1, the organic light emitting layer 116 disposed in the moisture permeation preventing portion MP may be in contact with the plurality of lower dams LD and the upper surface of the planarization layer 113, and may not be in contact with the inorganic layer 111.

In contrast, in case of the transparent display apparatus according to FIG. 4, a plurality of planarization layers 113 of the moisture permeation preventing portion MP may be disposed to be spaced apart from each other on the inorganic layer 111. Therefore, as shown in FIG. 4, the plurality of planarization layers 113 may be spaced apart from each other on the inorganic layer 111 (or the passivation layer 111c). The plurality of planarization layers 113 may be formed in such a manner that a portion of the planarization layer 113 may be patterned through a photolithography process and an etching process after a material constituting the planarization layer 113 is formed on the inorganic layer 111. Alternatively, the plurality of planarization layers 113 may be formed in such a manner that a portion of a material constituting the lower dam LD and a portion of a material constituting the planarization layer 113 are simultaneously patterned through a photolithography process and an etching process after the material constituting the planarization layer 113 and the material constituting the lower dam LD are sequentially stacked on the inorganic layer 111 as a single layer. Therefore, the transparent display apparatus according to FIG. 4 may be provided such that each of the plurality of lower dams LD overlaps each of the plurality of planarization layers 113.

Meanwhile, as shown in FIG. 4, the organic light emitting layer 116 formed by a subsequent process may cover the upper surface and sides of each of the lower dams LD, sides of each of the planarization layers 113 disposed on the lower surface of the lower dam LD and the upper surface of the inorganic layer 111 (or the passivation layer 111c).

Therefore, in the transparent display apparatus according to FIG. 4, the gap between the first substrate 110 and the second substrate 120 may be reduced due to the plurality of lower dams LD provided on the upper surface of each of the plurality of planarization layers 113. Therefore, the moisture permeation preventing portion MP of the transparent display apparatus 100 according to FIG. 4 may prevent water and the like from being permeated into the display area DA from the gate driver GD (or the outside of the display panel).

Also, in case of the transparent display apparatus according to FIG. 4, the plurality of planarization layers 113 disposed in the moisture permeation preventing portion MP are disposed to be spaced apart from each other, so that each of the plurality of lower dams LD may be disposed on the upper surface of each of the plurality of planarization layers 113. The organic light emitting layer 116 disposed between the lower dams LD may be in contact with the sides of each of the planarization layers 113 disposed to be spaced apart from each other and the upper surface of the inorganic layer 111 between the planarization layers 113. Therefore, in the transparent display apparatus according to FIG. 4, the organic light emitting layer 116 disposed in the moisture permeation preventing portion MP may be provided to be longer than that of the transparent display apparatus according to FIG. 1. When the length of the organic light emitting layer 116 is longer, since a permeation path of water outside the substrate 110 through the organic light emitting layer 116 is lengthened, moisture permeation to the display area DA may be avoided more effectively.

Referring back to FIG. 4, the slit portion SLT may be provided between the plurality of lower dams LD and between the planarization layers 113. As shown in FIG. 4, the slit portion SLT may be provided in the form of a concave groove as the plurality of planarization layers 113 and the plurality of lower dams LD are disposed to be spaced apart from each other on the inorganic layer 111 (or the passivation layer 111c). As described above, the plurality of planarization layers 113 and the plurality of lower dams LD on the inorganic layer 111 may be provided together through a photolithography process and an etching process. Therefore, the slit portion SLT in the form of a concave groove may be provided such that its width becomes narrower from the second substrate 120 toward the first substrate 110. Since the slit portion SLT according to FIG. 4 is patterned to reach the planarization layer 113, the slit portion SLT according to FIG. 4 may be formed to be deeper than the slit portion SLT according to FIG. 1. For example, the slit portion SLT according to FIG. 1 has a first depth D1, whereas the slit portion SLT according to FIG. 4 may have a second depth D2 that is deeper than the first depth D1. Since the slit portion SLT according to FIG. 4 is provided between the plurality of lower dams LD and the plurality of planarization layers 113, the moisture permeation preventing portion MP may include a plurality of slit portions SLT.

The path of the organic light emitting layer 116, which is extended from the display area DA and provided in the GIP portion 200 and the moisture permeation preventing portion MP, may be longer than the case that there is no slit portion, due to the plurality of slit portions SLT in the form of a concave groove. For example, the organic light emitting layer 116 may be in contact with at least a portion of each of the plurality of lower dams LD, the plurality of planarization layers 113 and the inorganic layer 111. In more detail, the organic light emitting layer 116 may be in contact with the upper surface and sides of each of the plurality of lower dams LD, the sides of each of the plurality of planarization layers 113 and the upper surface of the inorganic layer 111 disposed between the plurality of planarization layers 113. Therefore, in the transparent display apparatus 100 according to another embodiment of the present disclosure, the path of the organic light emitting layer 116 is further lengthened due to the plurality of slit portions SLT, so that moisture permeation through the organic light emitting layer 116 may be further reduced or avoided as compared with the case that there is no slit portion.

Since FIG. 4 relates to a transparent display apparatus 100 according to another embodiment of the present disclosure, the plurality of slit portions shown in FIG. 4 may be expressed as a second slit portion SLT2. Since the second slit portion SLT2 is a recess groove provided between the plurality of lower dams LD and between the plurality of planarization layers 113, the second slit portion SLT2 may be expressed as a slit of the lower dam and the planarization layer.

FIG. 5 is a cross-sectional view illustrating a transparent display apparatus according to other embodiment.

Referring to FIG. 5, the transparent display apparatus 100 according to other embodiment of the present disclosure is the same as the transparent display apparatus of FIG. 4 except that it further includes an undercut portion UC. Therefore, the same reference numerals will be given to the same elements, and the following description will be based on a difference from the transparent display apparatus of FIG. 4.

In case of the transparent display apparatus according to FIG. 4, the plurality of planarization layers 113 may be disposed to be spaced apart from each other on the inorganic layer 111 of the moisture permeation preventing portion MP, and each of the lower dams LD may be disposed on the upper surface of each of the plurality of planarization layers 113. Therefore, in case of the transparent display apparatus according to FIG. 4, the gap between the first substrate 110 and the second substrate 120 may be reduced due to the plurality of lower dams LD provided on the upper surface of each of the plurality of planarization layers 113. Therefore, water and the like from the gate driver GD (or the outside of the display panel) may be prevented being permeated into the display area DA.

Also, in case of the transparent display apparatus according to FIG. 4, the organic light emitting layer 116 disposed between the lower dams LD may be in contact with the sides of each of the planarization layers 113 disposed to be spaced apart from each other in the plurality of slit portions SLT and the upper surface of the inorganic layer 11 between the planarization layers 113. Therefore, in the transparent display apparatus according to FIG. 4, a moisture permeation path through the organic light emitting layer 116 is lengthened as compared with the transparent display apparatus according to FIG. 1, so that moisture permeation to the display area DA may be avoided more effectively.

In contrast, in case of the transparent display apparatus according to FIG. 5, each of a plurality of planarization layers 113 and each of a plurality of inorganic layers 111 may be provided to be spaced apart from each other on the substrate 110. Therefore, as shown in FIG. 5, each of the plurality of planarization layers 113 and each of the inorganic layers 111 may be disposed to be spaced apart from each other on the substrate 110. The plurality of inorganic layers 111 may be formed in such a manner that a portion of the inorganic layer 111 may be patterned through a photolithography process and an etching process after a material constituting the inorganic layer 111 is formed on the substrate 110. Alternatively, the plurality of inorganic layers 111 may be formed in such a manner that a portion of a material constituting inorganic layer 111, a portion of a material constituting the planarization layer 113 and a portion of a material constituting the lower dam LD are simultaneously patterned through a photolithography process and an etching process after the material constituting the inorganic layer 111, the material constituting the planarization layer 113 and the material constituting the lower dam LD are sequentially stacked on the substrate 110 as a single layer. Therefore, the transparent display apparatus according to FIG. 5 may be provided such that each of the plurality of lower dams LD overlaps each of the plurality of planarization layers 113 and each of the plurality of inorganic layers 111.

The moisture permeation preventing portion MP may include an undercut portion UC in which each of the plurality of inorganic layers 111 is partially patterned and removed. The undercut portion UC is to disconnect the organic light emitting layer 116 provided in the moisture permeation preventing portion MP. Since the undercut portion UC is provided in each of the plurality of inorganic layers 111, a plurality of undercut portions UC may be provided in the moisture permeation preventing portion MP.

Meanwhile, in the transparent display apparatus according to FIG. 5, the moisture permeation preventing portion MP may include a plurality of slit portions SLT. Each of the plurality of slit portions SLT may be provided between the lower dams LD, between the planarization layers 113 and between the undercut portions UC. As shown in FIG. 5, the slit portion SLT may be provided in the form of a concave groove as the plurality of inorganic layers 111, the plurality of planarization layers 113 and the plurality of lower dams LD are spaced apart from one another on the substrate 110. As described above, the plurality of inorganic layers 111, the plurality of planarization layers 113 and the plurality of lower dams LD on the substrate 110 may be provided together through a photolithography process and an etching process. Therefore, the slit portion SLT in the form of a concave groove may be provided such that its width becomes narrower from the second substrate 120 toward the first substrate 110. Since the slit portion SLT according to FIG. 5 is patterned to reach the inorganic layer 111, the slit portion SLT according to FIG. 5 may be formed to be deeper than the slit portion SLT according to FIG. 4. For example, the slit portion SLT according to FIG. 4 may have a second depth D2, whereas the slit portion SLT according to FIG. 5 may be provided to have a third depth D3 deeper than the second depth D2. Since the slit portion SLT according to FIG. 5 is provided among the plurality of lower dams LD, the plurality of planarization layers 113 and the plurality of inorganic layers 111, the moisture permeation preventing portion MP may include a plurality of slit portions SLT.

As shown in FIG. 5, each of the plurality of slit portions SLT may be provided with an undercut portion UC. Since the organic light emitting layer 116 may be disconnected by a step difference between a tip of the planarization layer 113 and/or the lower surface of the planarization layer 113 and the upper surface of the substrate 110 in the undercut portion UC, the moisture permeation path through the organic light emitting layer 116 may be blocked.

The undercut portion UC of the slit portion SLT will be described detail with reference to FIG. 5. The undercut portion UC may be disposed between the first substrate 110 and the planarization layer 113 disposed in the moisture permeation preventing portion MP. For example, the undercut portion UC may be formed as the buffer layer BL, the gate insulating layer 111a, the interlayer insulating layer 111b and the passivation layer 111c, which are disposed between the plurality of lower dams LD, are removed. The inorganic layer 111 disposed between the plurality of lower dams LD, that is, the buffer layer BL, the gate insulating layer 111a, the interlayer insulating layer 111b and the passivation layer 111c, may be removed after the plurality of lower dams LD and the plurality of planarization layers 113 are provided. In more detail, after the material constituting the lower dam LD is formed on the planarization layer 113 of the moisture permeation preventing portion MP, a portion of the material constituting the lower dam LD and the planarization layer 113 are primarily removed through an exposure process and a dry etching process, which use a photoresist and a mask, and then the inorganic layer 111 disposed between the plurality of lower dams LD may be secondarily removed by a highly doped etchant. For example, the highly doped etchant may be a material that is capable of etching an inorganic layer such as $SiO_2$. The highly doped etchant may be in contact with the inorganic layer 111 disposed between the plurality of lower dams LD for about 20 seconds to about 50 seconds, thereby removing at least a portion of the inorganic layer 111 disposed between the plurality of lower dams LD.

Through the above-described process, an undercut portion UC having a predetermined width and height may be formed below the planarization layer 113 adjacent to the slit portion SLT of the moisture permeation preventing portion MP. In addition, the organic light emitting layer 116 disposed in the moisture permeation preventing portion MP (or the non-display area NDA) by a subsequent process may be disconnected from the plurality of slit portions SLT that include the undercut portion UC having a predetermined width and height. The undercut portion UC (or the plurality of slit portions SLT) may be disposed along the plurality of lower dams LD.

Therefore, in the transparent display apparatus 100 according to other embodiment of the present disclosure, the plurality of slit portions SLT including an undercut portion UC is provided in the moisture permeation preventing portion MP so that the organic light emitting layer 116 disposed in the moisture permeation preventing portion MP (or between the plurality of lower dams LD) may be provided to be disconnected. Therefore, the transparent display apparatus 100 according to other embodiment of the present disclosure may maximize anti-moisture permeation through the organic light emitting layer 116 disposed in the non-display area NDA, more particularly the moisture permeation preventing portion MP, whereby reliability of the transparent display apparatus 100 may be further improved.

Since FIG. 5 relates to a transparent display apparatus 100 according to other embodiment of the present disclosure, the plurality of slit portions shown in FIG. 5 may be expressed as a third slit portion SLT3. Since the third slit portion SLT3 is a recess groove provided between the plurality of lower dams LD, between the plurality of planarization layers 113 and between the plurality of inorganic layers 111, the third slit portion SLT3 may be expressed as a slit of the lower dam, the planarization layer and the inorganic layer.

Meanwhile, since at least a portion of the inorganic layer 111 is not disposed in the plurality of slit portions SLT provided in the moisture permeation preventing portion MP, the plurality of slit portions may have high light transmittance as compared with the case that the entire inorganic layer 111 is disposed. Therefore, the plurality of slit portions SLT provided in the moisture permeation preventing portion MP may function as a transmissive portion through which an image or background disposed on the rear surface of the display panel may be transmitted. Therefore, the plurality of slit portions SLT (or lower dams LD) provided in the moisture permeation preventing portion MP are provided in a structure similar to that of the transmissive portion TR of the display area DA, so that the difference in visibility between the non-display area NDA and the display area DA may be reduced and overall transmittance of the transparent display apparatus 100 according to the present disclosure may be improved.

The transparent display apparatus 100 according to one embodiment of the present disclosure may include an outer area OA.

The outer area OA may refer to an area disposed between the end of the first substrate 110 and the gate driver GD (or the GIP portion 200). The outer area OA may include a plurality of outer dams OD as shown in FIG. 1. According to one embodiment of the present disclosure, the plurality of outer dams OD are to prevent the transparent connection member TD disposed in the non-display area NDA from overflowing to the outside of the first substrate 110 (or the display panel). Therefore, the plurality of outer dams OD may be disposed to surround the gate driver GD. In the non-display area NDA in which the gate driver GD and the moisture permeation preventing portion MP are not disposed, the plurality of outer dams OD may be disposed to surround the display area DA. As a result, the plurality of outer dams OD may be disposed between the end of the first substrate 110 and the gate driver GD to surround the gate driver GD, the moisture permeation preventing portion MP and the display area DA.

Meanwhile, the plurality of outer dams OD may be disposed to be spaced apart from each other between the end of the first substrate 110 and the gate driver GD. Therefore, the plurality of outer dams OD may more effectively prevent the transparent connection member TD from overflowing to the outside of the first substrate 110 than the case that only one outer dam OD is provided. In addition, in the transparent display apparatus 100 according to one embodiment of the present disclosure, since an outer dam of a general transparent display apparatus is omitted, the bezel width may be reduced, and a plurality of outer dams OD are included in the outer area OA in which a bezel is disposed, whereby moisture permeation through the transparent connection member TD may be minimized.

The outer area OA having the plurality of outer dams OD may be provided in the same structure as at least one of the moisture permeation preventing portions MP of FIGS. 2, 4 and 5, so that a gap between the first and second substrates 110 and 120 may be reduced to avoid moisture permeation. That is, the plurality of outer dams OD may be provided in the same manner as at least one of a plurality of lower dams LD or a plurality of upper dams UD of the moisture permeation preventing portion MP. A transparent connection member TD may be disposed on the outer dam OD to fill a gap between the first substrate 110 and the second substrate 120. Therefore, the plurality of outer dams OD and the transparent connection member TD, which are provided in the outer area OA, may doubly block moisture permeation to the display area DA together with the moisture permeation preventing portion MP.

Meanwhile, since the outer area OA is disposed to be close to the end of the first substrate 110, the organic light emitting layer may not be disposed in the outer area OA to maximize anti-moisture permeation, unlike the moisture permeation preventing portion MP, but the present disclosure is not limited thereto. In order to reduce the difference in visibility between the bezel and the display area DA, the organic light emitting layer may be provided in the outer area OA. In this case, the outer area OA may be provided with a plurality of slit portions SLT in the same manner as the moisture permeation preventing portion MP of FIGS. 2 to 5, so that the path of the organic light emitting layer may be lengthened or the organic light emitting layer may be disconnected.

As a result, the transparent display apparatus 100 according to one embodiment of the present disclosure may obtain the following effects.

First, in the transparent display apparatus 100 according to one embodiment of the present disclosure, as the moisture permeation preventing portion MP is provided between the gate driver GD (or the GIP portion 200) and the display area DA, the outer dam of the general transparent display apparatus may be omitted, whereby the bezel width may be reduced.

Second, in the transparent display apparatus 100 according to one embodiment of the present disclosure, as the moisture permeation preventing portion MP is provided between the gate driver GD (or the GIP portion 200) and the display area DA, moisture permeation to the display area DA may be avoided, whereby reliability may be improved.

Third, the transparent display apparatus 100 according to one embodiment of the present disclosure is provided such that the organic light emitting layer 116 is disposed in the moisture permeation preventing portion MP, whereby the difference in visibility between the moisture permeation preventing portion MP disposed in the non-display area NDA and the display area DA may be reduced.

Fourth, the transparent display apparatus 100 according to one embodiment of the present disclosure is provided such that the path of the organic light emitting layer 116 provided in the moisture permeation preventing portion MP is lengthened or disconnected by the plurality of slit portions SLT, whereby moisture permeation through the organic light emitting layer 116 may be reduced or avoided.

Fifth, in the transparent display apparatus 100 according to one embodiment of the present disclosure, the outer area OA and the moisture permeation preventing portion MP are provided on both sides of the gate driver GD, so that anti-moisture permeation to the display area DA may be maximized.

According to the present disclosure, the following advantageous effects may be obtained.

In the present disclosure, the moisture permeation preventing portion is disposed between the GIP portion of the non-display area and the display area, so that the bezel width may be reduced.

Also, the moisture permeation preventing portion is disposed between the GIP portion of the non-display area and the display area, so that moisture permeation to the display area may be avoided.

Also, in the present disclosure, the organic light emitting layer is disposed in the moisture permeation preventing portion provided between the GIP portion of the non-display area and the display area, so that the difference in visibility between the non-display area and the display area may be reduced.

Also, in the present disclosure, the path of the organic light emitting layer may be lengthened or disconnected through the plurality of slit portions disposed between the GIP portion of the non-display area and the display area, so that moisture permeation through the organic light emitting layer may be avoided.

It will be apparent to those skilled in the art that various modifications and variations can be made in the transparent display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A transparent display apparatus, comprising:
a display area disposed on a substrate, including a pixel having a transmissive portion; and
a non-display area disposed near the display area, having a GIP (gate driver in panel) portion;
a moisture permeation preventing portion disposed between the GIP portion and the display area, and including a plurality of lower dams surrounding the display area on the substrate;
a plurality of planarization layers disposed between the substrate and the plurality of lower dams;
an inorganic layer disposed between the substrate and the plurality of planarization layers; and
an organic light emitting layer extended from the display area and provided in the GIP portion and the moisture permeation preventing portion,
wherein the plurality of planarization layers are spaced apart from each other on the inorganic layer, and
wherein the organic light emitting layer is in contact with at least a portion of each of the plurality of lower dams, the plurality of planarization layers, and the inorganic layer.

2. The transparent display apparatus of claim 1, further comprising a slit portion provided between the lower dams,
wherein the moisture permeation preventing portion includes a plurality of slit portions.

3. The transparent display apparatus of claim 1, further comprising an opposite substrate disposed to face the substrate,
wherein the moisture permeation preventing portion includes a transparent connection member disposed between the plurality of lower dams and the opposite substrate.

4. The transparent display apparatus of claim 3, further comprising a plurality of upper dams disposed on the opposite substrate to at least partially overlap the plurality of lower dams.

5. The transparent display apparatus of claim 4, wherein the plurality of upper dams are provided to be transparent.

6. The transparent display apparatus of claim 3,
wherein the plurality of lower dams are disposed to be spaced apart from each other on the planarization layer.

7. The transparent display apparatus of claim 1, further comprising an outer area disposed between an end of the substrate and the GIP portion,
wherein the outer area includes a plurality of outer dams.

8. The transparent display apparatus of claim 6, wherein the organic light emitting layer is disposed between the plurality of lower dams and the transparent connection member, and
wherein the organic light emitting layer covers the plurality of lower dams and an upper surface of the planarization layer.

9. The transparent display apparatus of claim 1, wherein each of the plurality of lower dams overlaps each of the plurality of planarization layers.

10. The transparent display apparatus of claim 1, further comprising a slit portion provided between the lower dams and between the plurality of planarization layers,
wherein the moisture permeation preventing portion includes a plurality of slit portions.

11. The transparent display apparatus of claim 1,
wherein the inorganic layer and the planarization layer are disposed in plural number so that the plurality of inorganic layers are spaced apart from each other and the plurality of planarization layer are spaced apart from each other on the substrate.

12. The transparent display apparatus of claim 11, further comprising an undercut portion from which each of the plurality of inorganic layers is partially removed,
wherein the undercut portion is disposed along the plurality of lower dams.

13. The transparent display apparatus of claim 12, wherein the organic light emitting layer disposed in the moisture permeation preventing portion is disconnected from the undercut portion.

14. The transparent display apparatus of claim 12, wherein the moisture permeation preventing portion includes:
a plurality of the undercut portions; and
a slit portion between the lower dams, between the planarization layers and between the undercut portions, and
the moisture permeation preventing portion includes a plurality of the slit portions.

15. A transparent display apparatus, comprising:
a display area provided on a substrate, including a pixel having a transmissive portion;
a non-display area near the display area, having a GIP (gate driver in panel) portion;
a plurality of lower dams disposed between the GIP portion and the display area to surround the display area;
a planarization layer disposed between the substrate and the plurality of lower dams;
an inorganic layer disposed between the planarization layer and the substrate; and
an organic light emitting layer that is in contact with the plurality of lower dams and the planarization layer and is not in contact with the inorganic layer,
wherein the planarization layer is disconnected or not disconnected between the plurality of lower dams, and
wherein the plurality of lower dams are spaced apart from each other in the non-display area.

16. The transparent display apparatus of claim 15, further comprising a slit portion provided between the lower dams,
wherein a plurality of the slit portions are disposed between the GIP portion and the display area.

17. The transparent display apparatus of claim 15, further comprising:
an opposite substrate disposed to face the substrate;
a transparent connection member disposed between the opposite substrate and the plurality of lower dams; and
a plurality of upper dams disposed between the transparent connection member and the opposite substrate,
wherein the plurality of upper dams are provided in the same or fewer number as or than that of the plurality of lower dams.

18. The transparent display apparatus of claim 15,
wherein the inorganic layer and the planarization layer are disposed in plural number so that the plurality of inorganic layers are spaced apart from each other and the plurality of planarization layer are spaced apart from each other on the substrate.

19. The transparent display apparatus of claim 18, further comprising an undercut portion from which each of the plurality of inorganic layers is partially removed,
wherein the undercut portion is provided in plural number between the GIP portion and the display area and is disposed along the plurality of lower dams.

20. The transparent display apparatus of claim 19, wherein the organic light emitting layer disposed between the plurality of lower dams is disconnected from the undercut portion.

21. The transparent display apparatus of claim 19, further comprising a slit portion between the lower dams, between the planarization layers and between the undercut portions,
wherein a plurality of the slit portions are provided between the GIP portion and the display area.

* * * * *